United States Patent
Ji et al.

(10) Patent No.: US 11,881,948 B2
(45) Date of Patent: Jan. 23, 2024

(54) DOWNLINK CONTROL INFORMATION BASED FEEDBACK TRANSMISSION

(71) Applicant: QUALCOMM Incorporated, San Diego, CA (US)

(72) Inventors: Lianghai Ji, San Diego, CA (US); Huilin Xu, Temecula, CA (US); Liangping Ma, San Diego, CA (US); Qiang Wu, San Diego, CA (US); Mehmet Izzet Gurelli, San Diego, CA (US); Jun Ma, San Diego, CA (US); Weimin Duan, San Diego, CA (US); Karthik Anantha Swamy, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 199 days.

(21) Appl. No.: 17/449,376

(22) Filed: Sep. 29, 2021

(65) Prior Publication Data

US 2023/0101780 A1    Mar. 30, 2023

(51) Int. Cl.

| | |
|---|---|
| *H04L 1/1812* | (2023.01) |
| *H04W 72/23* | (2023.01) |
| *H04L 1/1867* | (2023.01) |
| *H04W 72/044* | (2023.01) |
| *H04W 72/1263* | (2023.01) |
| *H04W 84/06* | (2009.01) |

(52) U.S. Cl.
CPC .......... *H04L 1/1819* (2013.01); *H04L 1/1896* (2013.01); *H04W 72/044* (2013.01); *H04W 72/1263* (2013.01); *H04W 72/23* (2023.01); *H04W 84/06* (2013.01)

(58) Field of Classification Search
CPC ... H04L 1/1819; H04L 1/1896; H04L 1/1664; H04L 1/1822; H04L 1/1861; H04L 5/0055; H04L 5/0094; H04W 72/044; H04W 72/1263; H04W 72/23; H04W 84/06

See application file for complete search history.

(56) References Cited

U.S. PATENT DOCUMENTS

| | | | | |
|---|---|---|---|---|
| 2018/0159668 A1* | 6/2018 | Phuyal | .................. | H04L 1/1861 |
| 2020/0153556 A1* | 5/2020 | Nammi | ................. | H04L 1/0026 |
| 2020/0195386 A1* | 6/2020 | Marinier | ............... | H04L 5/0091 |
| 2020/0351026 A1* | 11/2020 | Babaei | .................. | H04L 1/1822 |

(Continued)

OTHER PUBLICATIONS

International Search Report and Written Opinion—PCT/US2022/076698—ISA/EPO—dated Jan. 30, 2023.

(Continued)

*Primary Examiner* — Afshawn M Towfighi
(74) *Attorney, Agent, or Firm* — Harrity & Harrity, LLP

(57) ABSTRACT

Various aspects of the present disclosure generally relate to wireless communication. In some aspects, a user equipment (UE) may receive downlink control information (DCI) carrying information indicating an updated configuration for the UE, wherein the DCI is associated with a hybrid automatic repeat request (HARQ) process for which HARQ feedback regarding the DCI is disabled. The UE may transmit the HARQ feedback regarding the DCI based at least in part on the DCI carrying the information indicating the updated configuration. Numerous other aspects are described.

24 Claims, 11 Drawing Sheets

(56) References Cited

U.S. PATENT DOCUMENTS

2021/0344467 A1* 11/2021 Hooli .................... H04L 5/0037

OTHER PUBLICATIONS

NTT DOCOMO Inc., et al., "Discussion on HARQ Enhancements for NR NTN", 3GPP TSG RAN WG1 #106-e, R1-2107857, 3rd Generation Partnership Project, Mobile Competence Centre, 650, Route Des Lucioles, F-06921 Sophia-Antipolis Cedex, France, vol. RAN WG1, No. e-Meeting, Aug. 16, 2021-Aug. 27, 2021, Aug. 6, 2021, XP052033654, pp. 1-9, figures 1, 2 sections 2.1-2.2.
Partial International Search Report—PCT/US2022/076698—ISA/EPO—dated Dec. 8, 2022.

* cited by examiner

900

910
TRANSMIT, TO A UE, DCI INCLUDING INFORMATION INDICATING AN UPDATED CONFIGURATION FOR THE UE, WHEREIN, BASED AT LEAST IN PART ON THE DCI INCLUDING THE INFORMATION INDICATING THE UPDATED CONFIGURATION FOR THE UE, THE DCI INDICATES A SELECTED HARQ PROCESS FOR WHICH HARQ FEEDBACK REGARDING AT LEAST THE DCI IS ENABLED

920
MONITOR FOR THE HARQ FEEDBACK REGARDING THE DCI

FIG. 9

DOWNLINK CONTROL INFORMATION BASED FEEDBACK TRANSMISSION

INTRODUCTION

Aspects of the present disclosure relate to wireless communications, and more particularly, to techniques for downlink control information (DCI) based feedback transmission.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division, orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communication systems to overcome various challenges.

SUMMARY

One aspect provides a method of wireless communication performed by a UE, comprising: receiving downlink control information (DCI) carrying information indicating an updated configuration for the UE, wherein the DCI is associated with a hybrid automatic repeat request (HARQ) process for which HARQ feedback regarding the DCI is disabled; and transmitting the HARQ feedback regarding the DCI based at least in part on the DCI carrying the information indicating the updated configuration.

Another aspect provides a method of wireless communication performed by a UE, comprising: receiving information indicating a selected HARQ process associated with HARQ feedback regarding DCI carrying information indicating an updated configuration for the UE; receiving DCI carrying the information indicating the updated configuration for the UE and associated with the selected HARQ process; and transmitting the HARQ feedback regarding the DCI based at least in part on the DCI being associated with the selected HARQ process.

Another aspect provides a method of wireless communication performed by a base station, comprising: transmitting, to a UE, DCI including information indicating an updated configuration for the UE, wherein, based at least in part on the DCI including the information indicating the updated configuration for the UE, the DCI indicates a selected HARQ process for which HARQ feedback regarding the DCI is enabled; and monitoring for the HARQ feedback regarding the DCI.

Other aspects provide: an apparatus operable, configured, or otherwise adapted to perform the aforementioned methods as well as those described elsewhere herein; a non-transitory, computer-readable medium comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIG. 9 is a diagram illustrating an example process performed, for example, by a base station, in accordance with the present disclosure.

DETAILED DESCRIPTION

Figure 1:
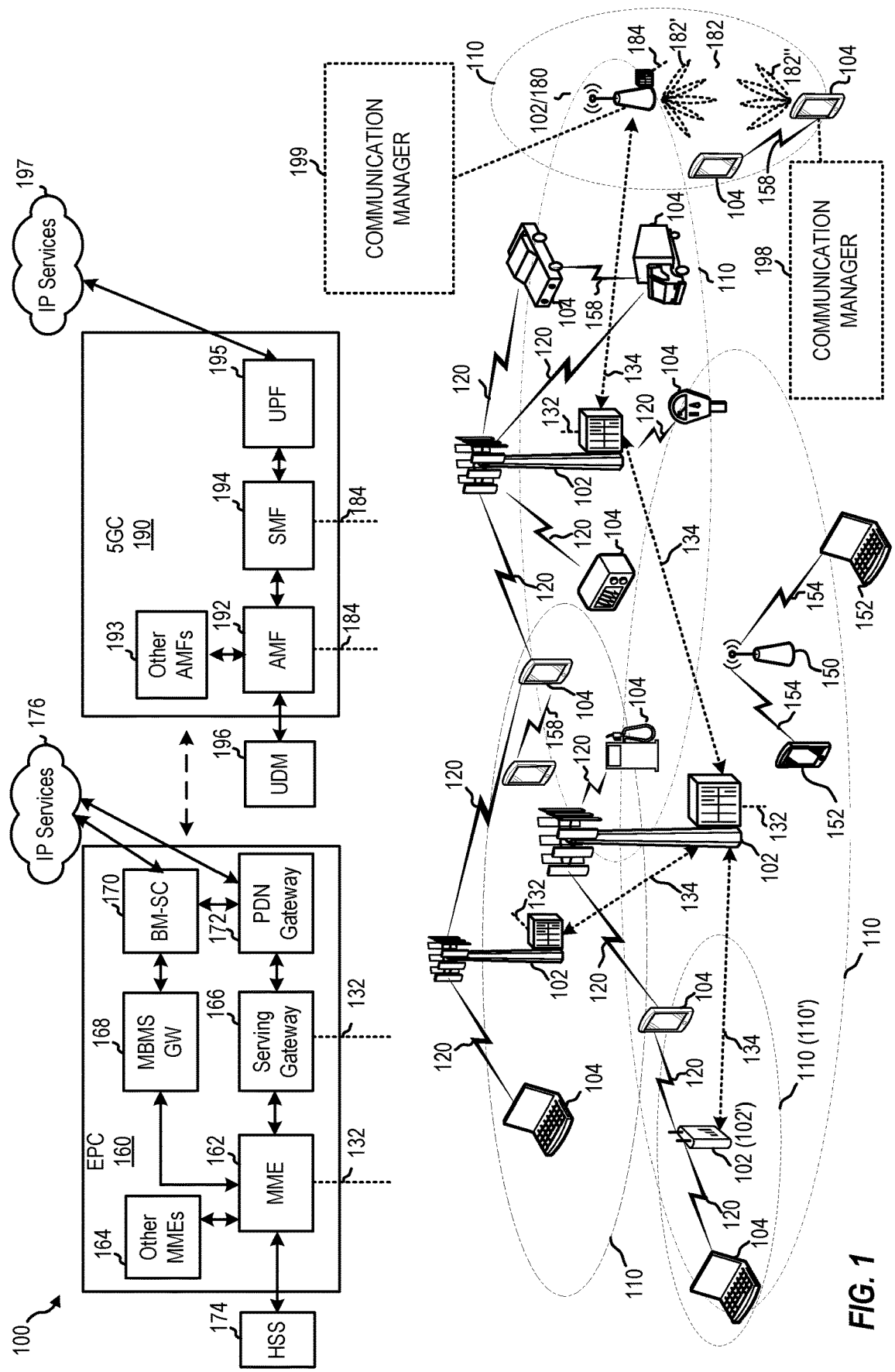
FIG. 1 is a block diagram conceptually illustrating an example wireless communication network.

Aspects of the present disclosure provide apparatuses, methods, processing systems, and computer-readable media for downlink control information (DCI) based feedback transmission. Aspects of the present disclosure provide for increased reliability of configuration of user equipment (UEs) via DCI signaling in deployments where feedback can be selectively disabled, such as non-terrestrial networks.

Hybrid automatic repeat request (HARQ) feedback provides a way for a UE to indicate whether a transmission was successfully received by the UE. For example, the HARQ feedback can indicate an acknowledgement (ACK) for a communication or a negative acknowledgment (NACK) for the communication. In one example, the communication may contain data and/or control information. HARQ feedback may be constructed based at least in part on HARQ processes (sometimes referred to as HARQ process numbers or HARQ process identifiers). When scheduled, a communication may be associated with a HARQ process. The UE may transmit feedback regarding the communication based at least in part on the HARQ process. HARQ feedback may be associated with a round-trip time (RTT). For example, propagation delay of a transmission from a transmitter to a receiver, processing time at the receiver to determine whether the transmission was received and to generate the HARQ feedback, propagation delay of the HARQ feedback from the receiver to the transmitter, and processing time at the transmitter may all contribute to the RTT of the HARQ feedback. HARQ feedback may be based at least in part on HARQ processes. A HARQ process can be associated with a number of transport blocks (TBs). The HARQ process associated with a communication (e.g., one or more TBs) may be signaled when scheduling the communication. For example, DCI scheduling the communication may indicate the HARQ process associated with the communication. HARQ processes may be selected from a finite pool of, for example, 8 HARQ process identifiers or 16 HARQ process identifiers.

As mentioned above, HARQ feedback may be associated with an RTT (referred to as a HARQ RTT). There are situations in which the HARQ RTT may make the HARQ feedback untenable. For example, consider a non-terrestrial network, in which propagation delay can be hundreds of milliseconds long due to the high altitude of a satellite or platform. If the network stops and waits for the length of a HARQ RTT in a non-terrestrial network before performing another transmission with the same HARQ process, then throughput may be negatively impacted. Therefore, some radio access technologies (RATs) allow HARQ feedback to be enabled or disabled for a HARQ process. For example, a HARQ process may be configured as feedback enabled (meaning that HARQ feedback should be transmitted for communications associated with the HARQ process) or feedback disabled (meaning that HARQ feedback should not be transmitted for communications associated with the HARQ process). Thus, if delay associated with the HARQ RTT is to be avoided, the network can schedule communications on a HARQ process for which feedback is disabled.

In some situations, DCI may convey information indicating an updated configuration relating to the operation of the UE. In some cases, this information indicating an updated configuration, if missed by the UE, may lead to an improper communication configuration between a base station and a UE. For example, if the UE continues to use an older configuration, the UE may fail and/or experience sub-optimal performance to communicate with the base station, since the network may start using the updated configuration after sending the DCI to the UE. HARQ feedback provides a way to indicate whether DCI was successfully received. For example, if the base station receives an acknowledgment or a negative acknowledgment for a communication scheduled by DCI, then the base station can determine that the DCI was received. If the base station receives no feedback regarding the communication, then the base station can determine that the DCI was likely not received (since the UE was not aware of the need to transmit HARQ feedback). However, as mentioned above, some RATs may allow HARQ feedback to be disabled for particular HARQ processes. If DCI carries information indicating an updated configuration, and if the DCI schedules a TB associated with an HARQ process, whose HARQ feedback is configured as disabled, then the base station may have no way of knowing whether the DCI was received since the UE will not transmit HARQ feedback for the scheduled TB. Therefore, it may be unclear whether the information indicating an updated configuration was received by the UE and can be used for subsequent communication with the UE, which may reduce throughput, increase resource usage associated with transmission or retransmission of the information indicating an updated configuration, and/or decrease reliability of network communications.

Some techniques described herein provide for feedback transmission regarding DCI carrying information indicating an updated configuration in a deployment where HARQ feedback can be selectively enabled or disabled for HARQ processes. For example, some techniques and apparatuses described herein provide for a UE to transmit HARQ feedback associated with DCI carrying information indicating an updated configuration irrespective of whether the DCI indicates a HARQ process for which HARQ feedback is enabled or disabled. Some other techniques and apparatuses described herein provide for a UE to be configured with a selected HARQ process which is associated with DCI carrying information indicating an updated configuration. If the UE receives DCI indicating the selected HARQ process, the UE may transmit HARQ feedback associated with the DCI irrespective of whether the selected HARQ process has feedback enabled or disabled. Some other techniques and apparatuses described herein provide for a base station to select a DCI process for which HARQ feedback is configured as enabled if the base station is to transmit DCI carrying information indicating an updated configuration. In this way, throughput may be increased, resource usage associated with transmission of information indicating an updated configuration is reduced, and reliability of network communications is increased.

Introduction to Wireless Communication Networks

FIG. 1 depicts an example of a wireless communication system 100, in which aspects described herein may be implemented.

Generally, wireless communication system 100 includes base stations (BSs) 102, UEs 104, one or more core networks, such as an Evolved Packet Core (EPC) 160 and 5G Core (5GC) network 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicle, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may also receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Wireless communication network 100 includes communication manager 199, which may be configured to transmit DCI including information indicating an updated configuration for a UE; and monitor for HARQ feedback regarding the DCI.

Wireless network 100 further includes communication manager 198, which may be used configured to receive DCI carrying information indicating an updated configuration for the UE; and transmit HARQ feedback regarding the DCI based at least in part on the DCI carrying the information indicating the updated configuration.

Figure 2:
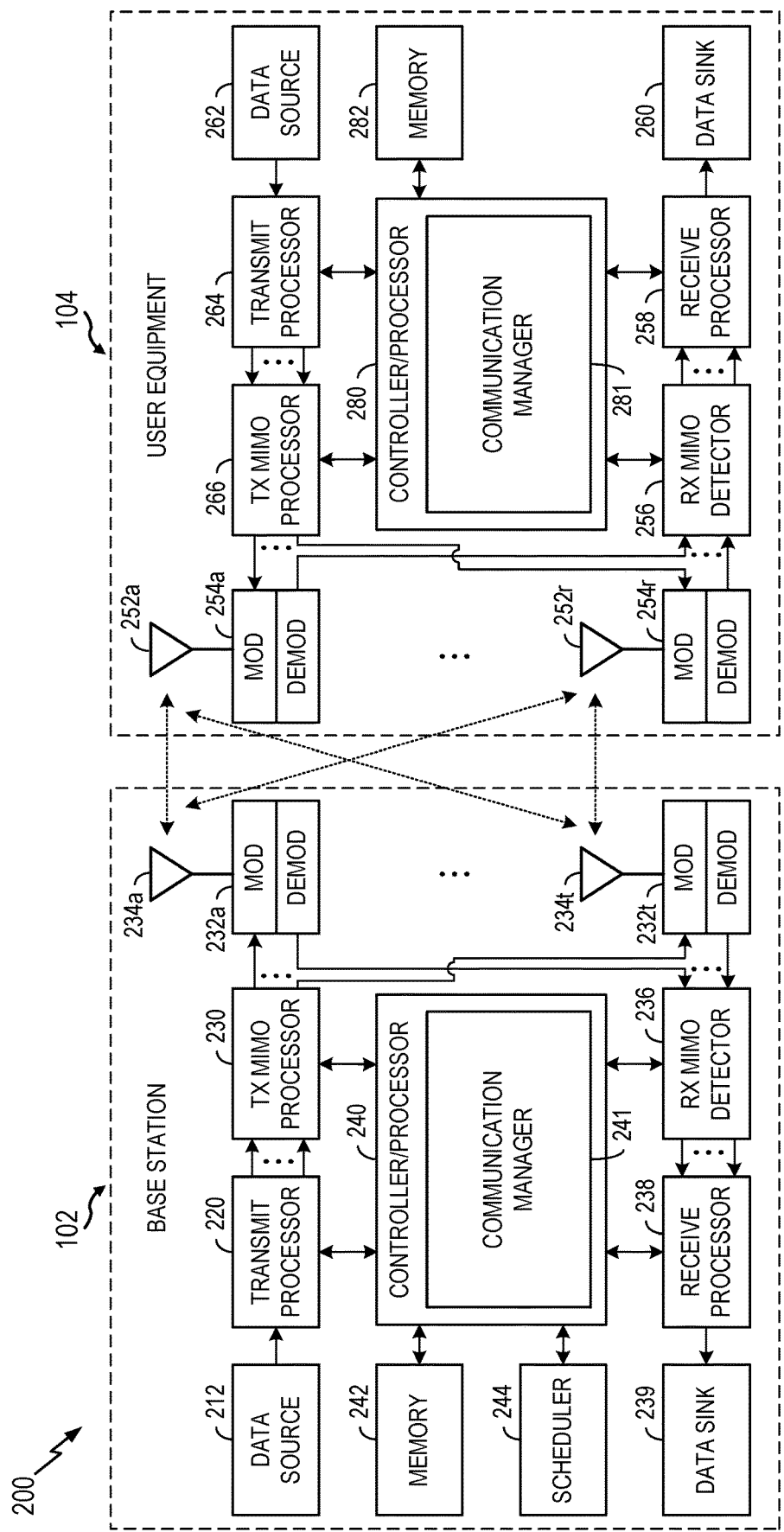
FIG. 2 is a block diagram conceptually illustrating aspects of an example of a base station and user equipment (UE).

FIG. 2 depicts aspects of an example BS 102 and a UE 104.

Generally, base station 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes communication manager 241, which may be representative of communication manager 199 of FIG. 1. Notably, while depicted as an aspect of controller/processor 240, communication manager 241 may be implemented additionally or alternatively in various other aspects of base station 102 in other implementations.

Generally, user equipment 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., data source 262) and wireless reception of data (e.g., data sink 260).

User equipment 104 includes controller/processor 280, which may be configured to implement various functions related to wireless communications. In the depicted example, controller/processor 280 includes communication manager 281, which may be representative of communication manager 198 of FIG. 1. Notably, while depicted as an aspect of controller/processor 280, communication manager 281 may be implemented additionally or alternatively in various other aspects of user equipment 104 in other implementations.

Figure 3:
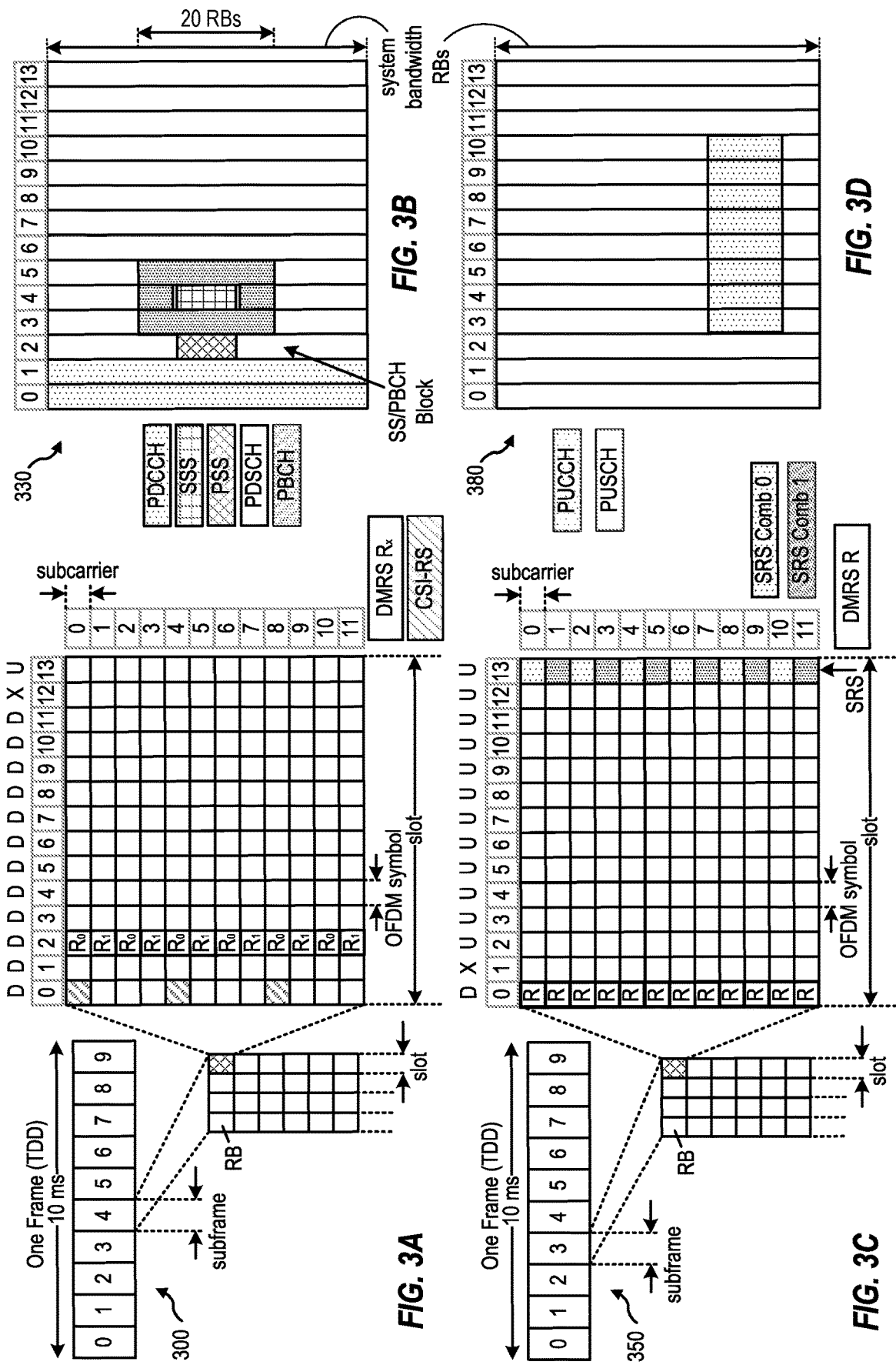
FIGS. 3A-3D depict various example aspects of data structures for a wireless communication network.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided below in this disclosure.

Aspects Related to DCI Based Feedback

Figure 4:
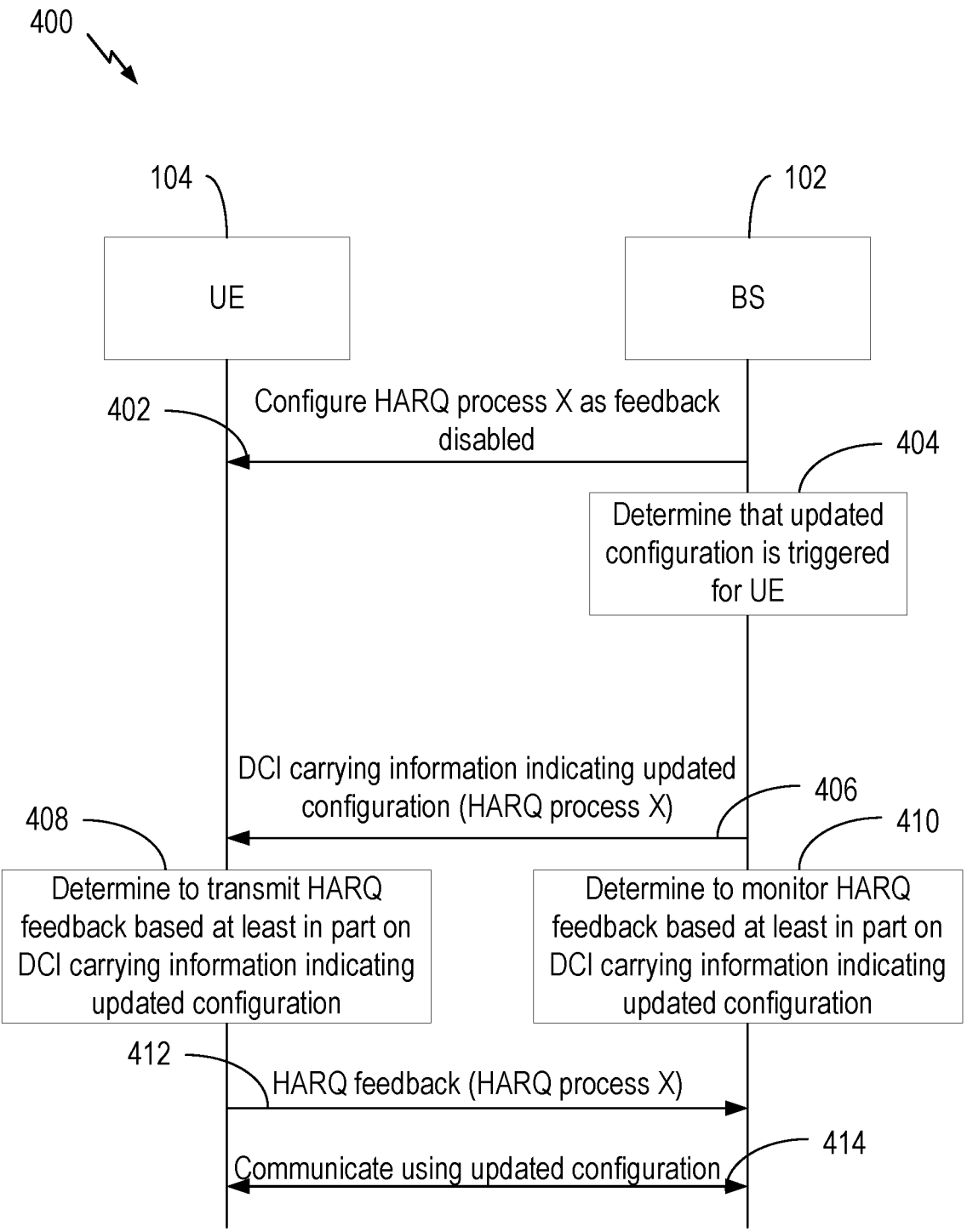
FIG. 4 is a diagram illustrating an example of providing hybrid automatic repeat request (HARQ) feedback for downlink control information (DCI) carrying information indicating an updated configuration.

FIG. 4 is a diagram illustrating an example 400 of providing HARQ feedback for DCI carrying information indicating an updated configuration. As shown, example 400 includes the BS 102 and the UE 104. In some aspects, the BS 102 may include communication manager 199 and/or the UE 104 may include communication manager 198, described elsewhere herein. In some aspects, the BS 102 may be associated with a non-terrestrial network. For example, the BS 102 may be associated with a satellite, a high altitude platform system (HAPS), a gateway, or a similar deployment.

As shown in FIG. 4, and by reference number 402, the BS 102 may configure a HARQ process (shown as HARQ Process X) such that feedback is disabled for the HARQ process. For example, the BS 102 may be capable of configuring individual HARQ processes or groups of HARQ process as HARQ feedback enabled (where HARQ feedback is provided regarding the HARQ process) or HARQ feedback disabled (where no HARQ feedback is provided regarding the HARQ process). In this example, HARQ feedback is disabled for HARQ process X.

As shown by reference number 404, the BS 102 may determine that an updated configuration is triggered for the UE 104. For example, the BS 102 may determine that updated configuration information or control information is to be provided to the UE 104, such as via DCI. The provision of the updated configuration via DCI is described in more detail in connection with reference number 406, below.

In some aspects, the updated configuration may include a bandwidth part (BWP) indicator. A BWP is a set of contiguous resource blocks (RBs). A UE may be configured with a number of BWPs. The UE 104 may expect to receive communications (e.g., shared channels and control channels) within an active BWP. The active BWP of a UE can be switched by a BWP indicator. For example, a BWP indicator may indicate that the UE 104 is to activate a particular uplink and/or downlink BWP, or is to switch from another BWP to the particular uplink and/or downlink BWP.

In some aspects, the updated configuration may include a secondary cell (SCell) dormancy indicator. An SCell is a cell of a carrier aggregation configuration. Carrier aggregation may involve a primary cell (PCell) and one or more SCells. Initial access, control signaling, management of SCells, and data communication may occur via the PCell. Data communication may occur via the one or more SCells. An SCell can be switched to a dormant BWP, and may thereafter be in a dormant state (which may conserve power of the UE 104). The SCell can also be switched to a non-dormant BWP for active data communication. The SCell dormancy indicator may indicate that the UE is to switch to a dormant BWP or a non-dormant BWP for an SCell or a group of SCells.

In some aspects, the updated configuration may include a minimum applicable scheduling offset indicator. For example, a scheduling offset can be a K0 offset, between a first downlink slot where DCI scheduling a communication is received and a second downlink slot where the scheduled communication is received. A scheduling offset can also be a K1 offset, which is an offset between the second downlink slot and a first uplink slot where feedback regarding the scheduled communication is transmitted. A scheduling offset can also be a K2 offset, which is an offset between a downlink slot where DCI scheduling an uplink transmission is received and an uplink slot where the uplink transmission is transmitted. The minimum applicable scheduling offset indicator may indicate a minimum applicable scheduling offset for cross-slot scheduling for an active BWP.

In some aspects, the updated configuration may indicate a physical downlink control channel (PDCCH) skipping indicator. A PDCCH skipping indicator may indicate that a UE can skip monitoring for a PDCCH (e.g., for a defined length of time, for a defined number of PDCCHs, until another PDCCH skipping indicator is received) or that a UE should resume monitoring for the PDCCH.

In some aspects, the updated configuration may indicate a search space (SS) set group (SSSG) switching indicator. For example, a PDCCH may be mapped onto an SS set based at least in part on content of DCI carried by the PDCCH. A UE 104 may be capable of switching between SSSGs, where an SSSG is composed of one or more SS sets and is identified by a group index. In one example, the SSSG switching indicator may indicate to switch to a search space set with a given group index.

In some aspects, the updated configuration may indicate a satellite enabling indicator, a satellite disabling indicator, a beam enabling indicator, or a beam disabling indicator. A satellite enabling indicator may dynamically (e.g., via DCI) indicate that a particular satellite (e.g., associated with BS 102 or another BS) should be enabled for communication with the UE 104. A satellite disabling indicator may dynamically (e.g., via DCI) indicate that a particular satellite (e.g., associated with BS 102 or another BS) should be disabled for communication with the UE 104. A beam enabling indicator may dynamically (e.g., via DCI) indicate that a particular beam (e.g., transmission configuration indicator state, quasi-colocation source) should be enabled for communication with the UE 104. A beam disabling indicator may dynamically (e.g., via DCI) indicate that a particular beam (e.g., transmission configuration indicator state, quasi-colocation source) should be disabled for communication with the UE 104.

In some aspects, the updated configuration may indicate a combination of two or more of the above-described configurations.

As shown by reference number 406, the BS 102 may transmit DCI. As further shown, the DCI may carry information indicating the updated configuration. For example, a payload of the DCI may include the information indicating the updated configuration. As further shown, the DCI may be associated with or indicate HARQ process X (for which feedback was disabled in connection with reference number 402). For example, the DCI may indicate that one or more TBs of a communication scheduled by the DCI are associated with HARQ process X.

As shown by reference number 408, the UE 104 may determine to transmit HARQ feedback based at least in part on the DCI carrying the information indicating the updated configuration. For example, the UE 104 may determine to transmit HARQ feedback associated with DCI (e.g., for a communication scheduled by the DCI) irrespective of whether HARQ feedback is configured as enabled or disabled for a HARQ process indicated by the DCI, based at least in part on the DCI carrying the information indicating the updated configuration. As shown by reference number 410, the BS 102 may determine to monitor for HARQ feedback based at least in part on the DCI carrying the information indicating the updated configuration. For example, the BS 102 may determine to monitor a physical uplink shared channel (PUSCH) or a physical uplink control channel (PUCCH) for HARQ feedback associated with the DCI (e.g., for a communication scheduled by the DCI) irrespective of whether HARQ feedback is configured as enabled or disabled for a HARQ process indicated by the DCI, based at least in part on the DCI carrying the information indicating the updated configuration.

As shown by reference number 412, the UE 104 may transmit the HARQ feedback. For example, the HARQ feedback may indicate an ACK/NACK associated with the DCI (e.g., the ACK/NACK may pertain to a communication scheduled by the DCI). If the UE 104 failed to receive the DCI, then the UE 104 may not transmit HARQ feedback regarding the DCI. Thus, the BS 102, based at least in part on the ACK/NACK or the lack of HARQ feedback regarding the DCI, can determine whether the DCI was received by the UE 104.

In some aspects, the UE 104 may transmit the HARQ feedback on a particular PUCCH or PUSCH resource. For example, the BS 102 may transmit an indication, to the UE 104, of a PUCCH resource or a PUSCH resource on which the UE 104 is to transmit HARQ feedback. In one example, the indication may be transmitted in the DCI in reference number 406 and/or in another message/step not shown in the figure. In some aspects, the PUCCH resource or the PUSCH resource may be for all HARQ feedback associated with HARQ processes for which HARQ feedback is disabled (e.g., for all HARQ feedback associated with DCI carrying information indicating an updated configuration). In some other aspects, the PUCCH resource or the PUSCH resource may be for the HARQ process X.

In some aspects, a PUCCH resource or a PUSCH resource may be indicated (e.g., explicitly) in the DCI. In some aspects, if a PUCCH resource or a PUSCH resource is not explicitly indicated in DCI associated with the HARQ feedback, the UE 104 may use a configured or pre-configured PUCCH resource or PUSCH resources. For example, the PUCCH resource or PUSCH resource may be determined based at least in part on a rule (e.g., mapping, function), taking into account at least one of information indicated by the DCI (e.g., a HARQ process identifier), a time resource and/or frequency resource of the DCI, a time resource and/or frequency resource of the scheduled TB, or the like. In some aspects, the rule may be configured by the BS 102. In some aspects, the rule may be specified in a wireless communication specification.

As shown by reference number 414, the UE 104 and the BS 102 may communicate using the updated configuration. For example, if the HARQ feedback indicates that the DCI was received (e.g., an ACK and/or a NACK), then the UE 104 and the BS 102 may communicate using the updated configuration. If the BS 102 determines that the DCI was not received (e.g., based at least in part on receiving no HARQ feedback), then the BS 102 may retransmit the updated configuration and/or may communicate with the UE 104 using a prior configuration.

Figure 5:
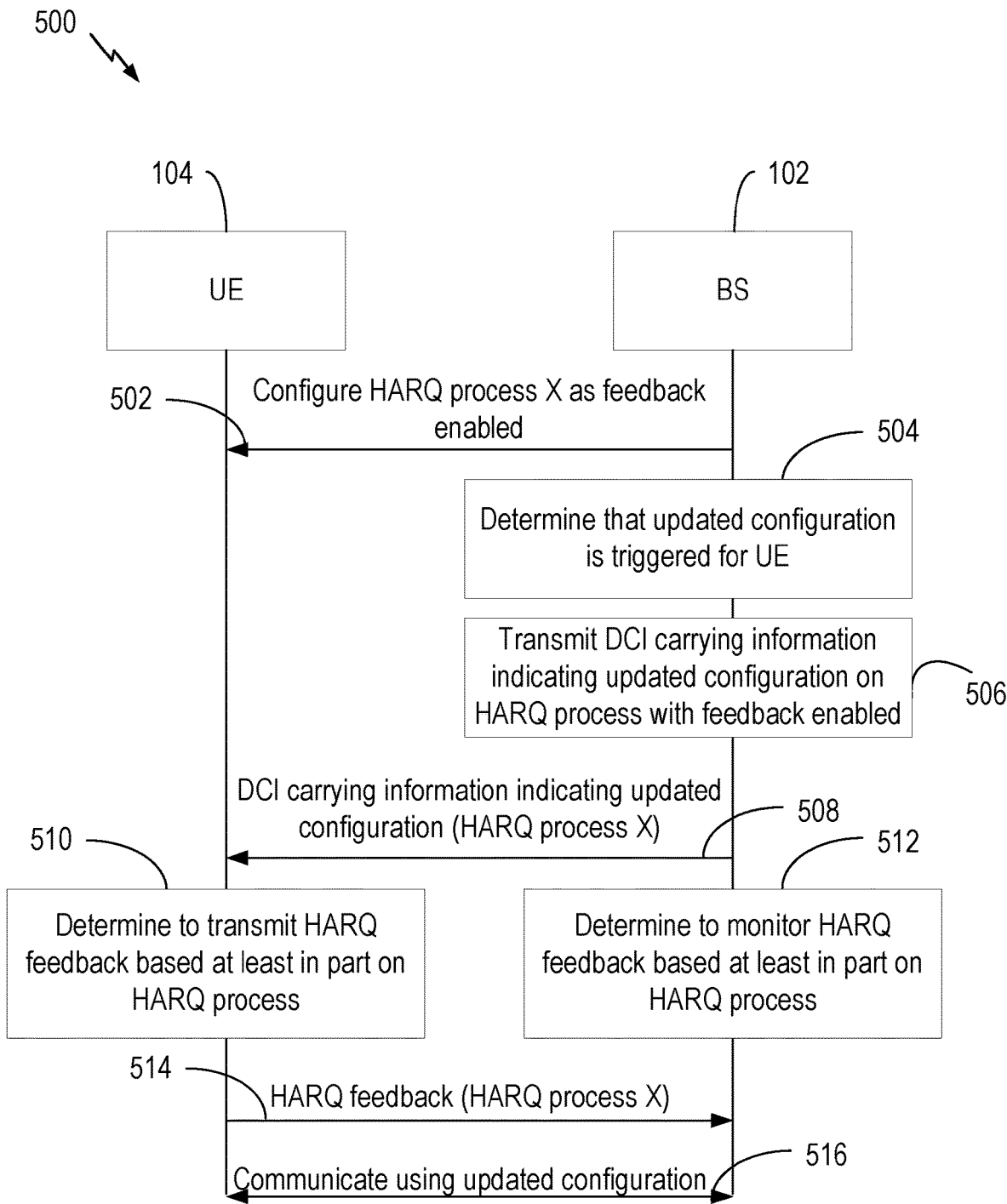
FIG. 5 is a diagram illustrating an example of providing HARQ feedback for DCI carrying information indicating an updated configuration.

FIG. 5 is a diagram illustrating an example 500 of providing HARQ feedback for DCI carrying information indicating an updated configuration. As shown, example 500 includes the BS 102 and the UE 104. In some aspects, the BS 102 may include communication manager 199 and/or the UE 104 may include communication manager 198, described elsewhere herein. In some aspects, the BS 102 may be associated with a non-terrestrial network. For example, the BS 102 may be associated with a satellite, a HAPS, a gateway, or a similar deployment.

As shown in FIG. 5, and by reference number 502, the BS 102 may configure a HARQ process (shown as HARQ Process X) such that feedback is enabled for the HARQ process. As shown by reference number 504, the BS 102 may determine that an updated configuration is triggered for the UE 104. For example, the BS 102 may determine that updated configuration information or control information is to be provided to the UE 104, such as via DCI. The provision of the updated configuration via DCI is described in more detail in connection with reference number 506, below.

In some aspects, the updated configuration may include a BWP indicator. In some aspects, the updated configuration may include an SCell dormancy indicator. In some aspects, the updated configuration may include a minimum applicable scheduling offset indicator. In some aspects, the updated configuration may indicate a PDCCH skipping indicator. A PDCCH skipping indicator may indicate that a UE can skip monitoring for a PDCCH (e.g., for a defined length of time, for a defined number of PDCCHs, until another PDCCH skipping indicator is received) or that a UE should resume monitoring for the PDCCH. In some aspects, the updated configuration may indicate an SSSG switching indicator. In some aspects, the updated configuration may indicate a satellite enabling indicator, a satellite disabling indicator, a beam enabling indicator, or a beam disabling indicator. In some aspects, the updated configuration may indicate a combination of two or more of the above configurations.

As shown by reference number 506, the BS 102 may determine to transmit DCI carrying information indicating the updated configuration on a HARQ process for which HARQ feedback is enabled. For example, the BS 102 may determine, based at least in part on the DCI carrying information indicating the updated configuration, that the DCI should be associated with or indicate a HARQ process for which HARQ feedback is enabled. In some aspects, if a DCI is used to schedule a communication associated with a HARQ process for which HARQ feedback is disabled, the DCI cannot be used to transmit information indicating an updated configuration. In this case, the BS 102 may wait for a next DCI associated with a HARQ process with HARQ feedback enabled to transmit the information indicating an updated configuration.

As shown by reference number 508, the BS 102 may transmit the DCI. As further shown, the DCI may carry information indicating the updated configuration. For example, a payload of the DCI may include the information indicating the updated configuration. As further shown, the DCI may be associated with HARQ process X (for which feedback was enabled in connection with reference number 502). For example, the DCI may indicate that one or more TBs of a communication scheduled by the DCI are associated with HARQ process X.

As shown by reference number 510, the UE 104 may determine to transmit HARQ feedback based at least in part on the DCI being associated with or indicating a HARQ process for which HARQ feedback is enabled. As shown by reference number 512, the BS 102 may determine to monitor for HARQ feedback based at least in part on the DCI being associated with or indicating a HARQ process for which HARQ feedback is enabled.

As shown by reference number 514, the UE 104 may transmit the HARQ feedback. For example, the HARQ feedback may indicate an ACK/NACK associated with the DCI (e.g., the ACK/NACK may pertain to a communication scheduled by the DCI). If the UE 104 failed to receive the DCI, then the UE 104 may not transmit HARQ feedback regarding the DCI. Thus, the BS 102, based at least in part on the ACK/NACK or the lack of HARQ feedback regarding the DCI, can determine whether the DCI was received by the UE 104.

In some aspects, the UE 104 may transmit the HARQ feedback on a particular PUCCH or PUSCH resource. For example, the BS 102 may transmit an indication, to the UE 104, of a PUCCH resource or a PUSCH resource on which the UE 104 is to transmit HARQ feedback. In some aspects, the PUCCH resource or the PUSCH resource may be for all HARQ feedback associated with HARQ processes for which HARQ feedback is disabled (e.g., for all HARQ feedback associated with DCI carrying information indicating an updated configuration). In some other aspects, the PUCCH resource or the PUSCH resource may be for the HARQ process X. In some aspects, a PUCCH resource or a PUSCH resource may be indicated (e.g., explicitly) in the DCI. In some aspects, if a PUCCH resource or a PUSCH resource is not explicitly indicated in DCI associated with the HARQ feedback, the UE 104 may use a configured or pre-configured PUCCH resource or PUSCH resources. For example, the PUCCH resource or PUSCH resource may be determined based at least in part on a rule (e.g., mapping, function), taking into account at least one of information indicated by the DCI (e.g., a HARQ process identifier), a time resource and/or frequency resource of the DCI, a time resource and/or frequency resource of the scheduled TB, or the like. In some aspects, the rule may be configured by the BS 102. In some aspects, the rule may be specified in a wireless communication specification.

As shown by reference number 516, the UE 104 and the BS 102 may communicate using the updated configuration. For example, if the HARQ feedback indicates that the DCI was received (e.g., an ACK and/or a NACK), then the UE 104 and the BS 102 may communicate using the updated configuration. If the BS 102 determines that the DCI was not received (e.g., based at least in part on receiving no HARQ feedback), then the BS 102 may retransmit the updated configuration and/or may communicate with the UE 104 using a prior configuration.

Figure 6:
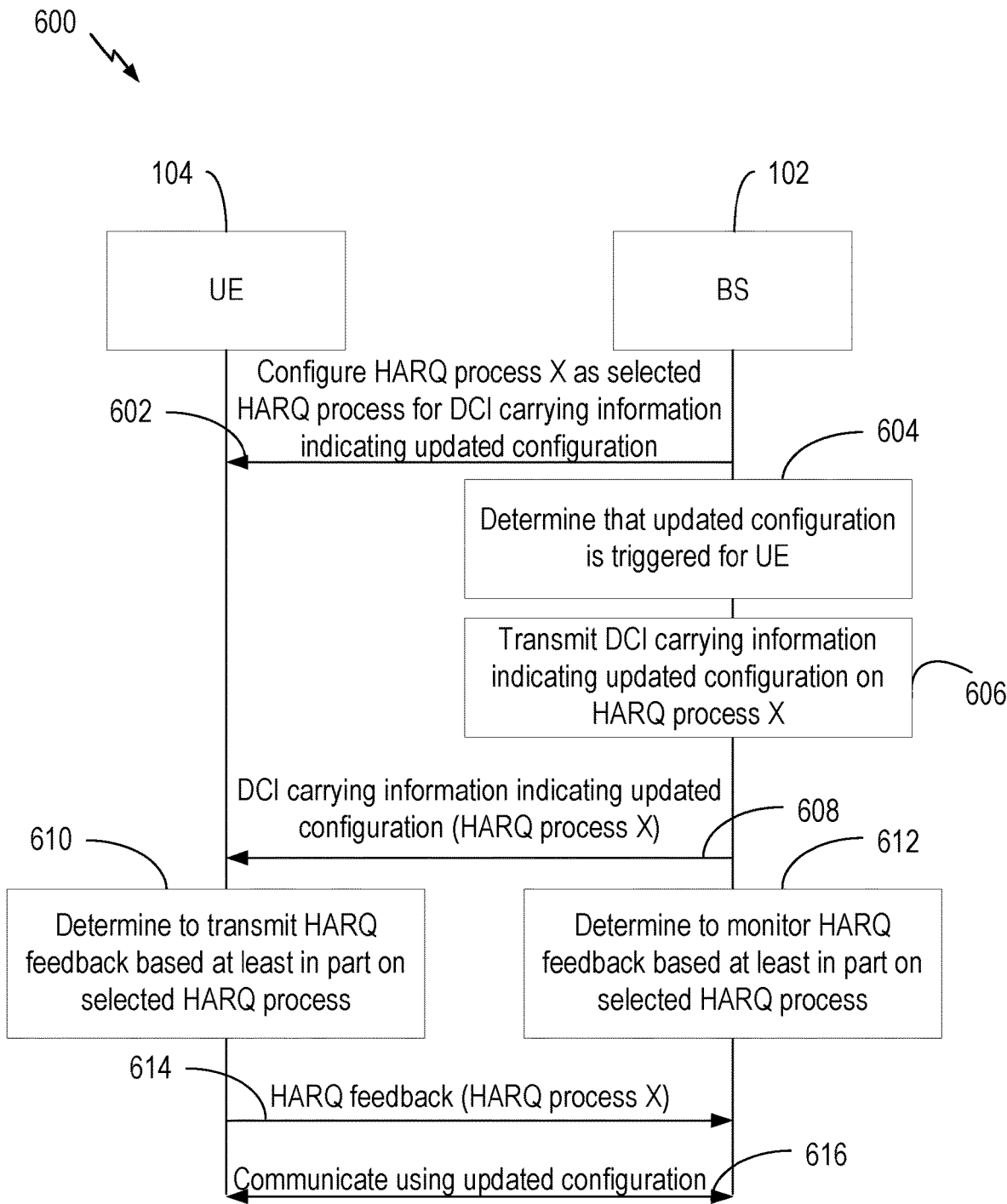
FIG. 6 is a diagram illustrating an example of providing HARQ feedback for DCI carrying information indicating an updated configuration.

FIG. 6 is a diagram illustrating an example 600 of providing HARQ feedback for DCI carrying information indicating an updated configuration. As shown, example 600 includes the BS 102 and the UE 104. In some aspects, the BS 102 may include communication manager 199 and/or the UE 104 may include communication manager 198, described elsewhere herein. In some aspects, the BS 102 may be associated with a non-terrestrial network. For example, the BS 102 may be associated with a satellite, a HAPS, a gateway, or a similar deployment.

As shown in FIG. 6, and by reference number 602, the BS 102 may configure a HARQ process (shown as HARQ Process X) as a selected HARQ process. For example, the BS 102 may configure the HARQ process as a selected HARQ process that is to be associated with DCI carrying updated configurations (e.g., DCI carrying information indicating an updated configuration for a UE 104, as defined elsewhere herein). If a UE 104 receives DCI associated with or indicating the selected HARQ process, the UE 104 may transmit HARQ feedback associated with the DCI. For example, the UE 104 may transmit the HARQ feedback irrespective of whether HARQ feedback for the selected HARQ process is enabled or disabled. As another example, the UE 104 may transmit the HARQ feedback irrespective of whether or not the DCI schedules a TB. As shown by reference number 604, the BS 102 may determine that an updated configuration is triggered for the UE 104. For example, the BS 102 may determine that updated configuration information or control information is to be provided to the UE 104, such as via DCI. The provision of the updated configuration via DCI is described in more detail in connection with reference number 606, below.

In some aspects, the updated configuration may include a BWP indicator. In some aspects, the updated configuration may include a SCell dormancy indicator. In some aspects, the updated configuration may include a minimum applicable scheduling offset indicator. In some aspects, the updated configuration may indicate a PDCCH skipping indicator. A PDCCH skipping indicator may indicate that a UE can skip monitoring for a PDCCH (e.g., for a defined length of time, for a defined number of PDCCHs, until another PDCCH skipping indicator is received) or that a UE should resume monitoring for the PDCCH. In some aspects, the updated configuration may indicate an SSSG switching indicator. In some aspects, the updated configuration may indicate a satellite enabling indicator, a satellite disabling indicator, a beam enabling indicator, or a beam disabling indicator. In some aspects, the updated configuration may indicate a combination of two or more of the above configurations.

As shown by reference number 606, the BS 102 may determine to transmit DCI carrying information indicating the updated configuration on the selected HARQ process. For example, the BS 102 may determine, based at least in part on the DCI carrying information indicating the updated configuration, that the DCI should be associated with or indicate the selected HARQ process. Thus, the BS 102 can flexibly and dynamically determine whether an updated configuration for a UE 104 should be acknowledged by the UE 104. For example, if the BS 102 requires the HARQ feedback to acknowledge reception of the DCI, the BS 102 may transmit the DCI as associated with the selected HARQ process. If the BS 102 determines that HARQ feedback regarding an updated configuration is not necessary, then the BS 102 can transmit the DCI as associated with a HARQ process other than the selected HARQ process (e.g., a HARQ process for which HARQ feedback is configured as disabled or enabled).

As shown by reference number 608, the BS 102 may transmit the DCI. As further shown, the DCI may carry information indicating the updated configuration. For example, a payload of the DCI may include the information indicating the updated configuration. As further shown, the DCI may be associated with or indicate the selected HARQ process, HARQ process X. For example, the DCI may indicate that one or more TBs of a communication scheduled by the DCI are associated with HARQ process X. As another example, the DCI may not schedule one or more TBs, and may indicate HARQ process X.

As shown by reference number 610, the UE 104 may determine to transmit HARQ feedback based at least in part on the DCI being associated with the selected HARQ process. As shown by reference number 612, the BS 102 may determine to monitor for HARQ feedback based at least in part on the DCI being associated with the selected HARQ process.

As shown by reference number 614, the UE 104 may transmit the HARQ feedback. For example, the HARQ feedback may be associated with the selected HARQ process, and may indicate an ACK/NACK associated with the DCI (e.g., the ACK/NACK may pertain to a communication scheduled by the DCI). If the UE 104 failed to receive the DCI, then the UE 104 may not transmit HARQ feedback regarding the DCI. Thus, the BS 102, based at least in part on the ACK/NACK or the lack of HARQ feedback regarding the DCI, can determine whether the DCI was received by the UE 104. In some aspects, the HARQ feedback may be associated with a higher priority than the communication/ TB(s) scheduled by the DCI. For example, HARQ feedback associated with the selected HARQ process may be associated with a higher priority than the TB(s) scheduled by the DCI indicating the selected HARQ process. Thus, if the UE 104 has to (de-)prioritize the transmission of the HARQ feedback associated with the selected HARQ process and another communication task(s), e.g. due to the capability of the UE 104, the UE 104 may prioritize the transmission of the HARQ feedback associated with the selected HARQ process over the other communication task(s).

In some aspects, the UE 104 may transmit the HARQ feedback on a particular PUCCH or PUSCH resource. For example, the BS 102 may transmit an indication, to the UE 104, of a PUCCH resource or a PUSCH resource on which the UE 104 is to transmit HARQ feedback. In some aspects, the PUCCH resource or the PUSCH resource may be for all HARQ feedback associated with HARQ processes for which HARQ feedback is disabled (e.g., for all HARQ feedback associated with DCI carrying information indicating an updated configuration). In some other aspects, the PUCCH resource or the PUSCH resource may be for the HARQ process X. In some aspects, a PUCCH resource or a PUSCH resource may be indicated (e.g., explicitly) in the DCI. In some aspects, if a PUCCH resource or a PUSCH resource is not explicitly indicated in DCI associated with the HARQ feedback, the UE 104 may use a configured or pre-configured PUCCH resource or PUSCH resources. For example, the PUCCH resource or PUSCH resource may be determined based at least in part on a rule (e.g., mapping, function), taking into account at least one of information indicated by the DCI (e.g., a HARQ process identifier), a time resource and/or frequency resource of the DCI, a time resource and/or frequency resource of the scheduled TB, or the like. In some aspects, the rule may be configured by the BS 102. In some aspects, the rule may be specified in a wireless communication specification.

As shown by reference number 616, the UE 104 and the BS 102 may communicate using the updated configuration. For example, if the HARQ feedback indicates that the DCI was received (e.g., an ACK and/or a NACK), then the UE 104 and the BS 102 may communicate using the updated configuration. If the BS 102 determines that the DCI was not received (e.g., based at least in part on receiving no HARQ feedback), then the BS 102 may retransmit the updated configuration and/or may communicate with the UE 104 using a prior configuration.

Figure 7:
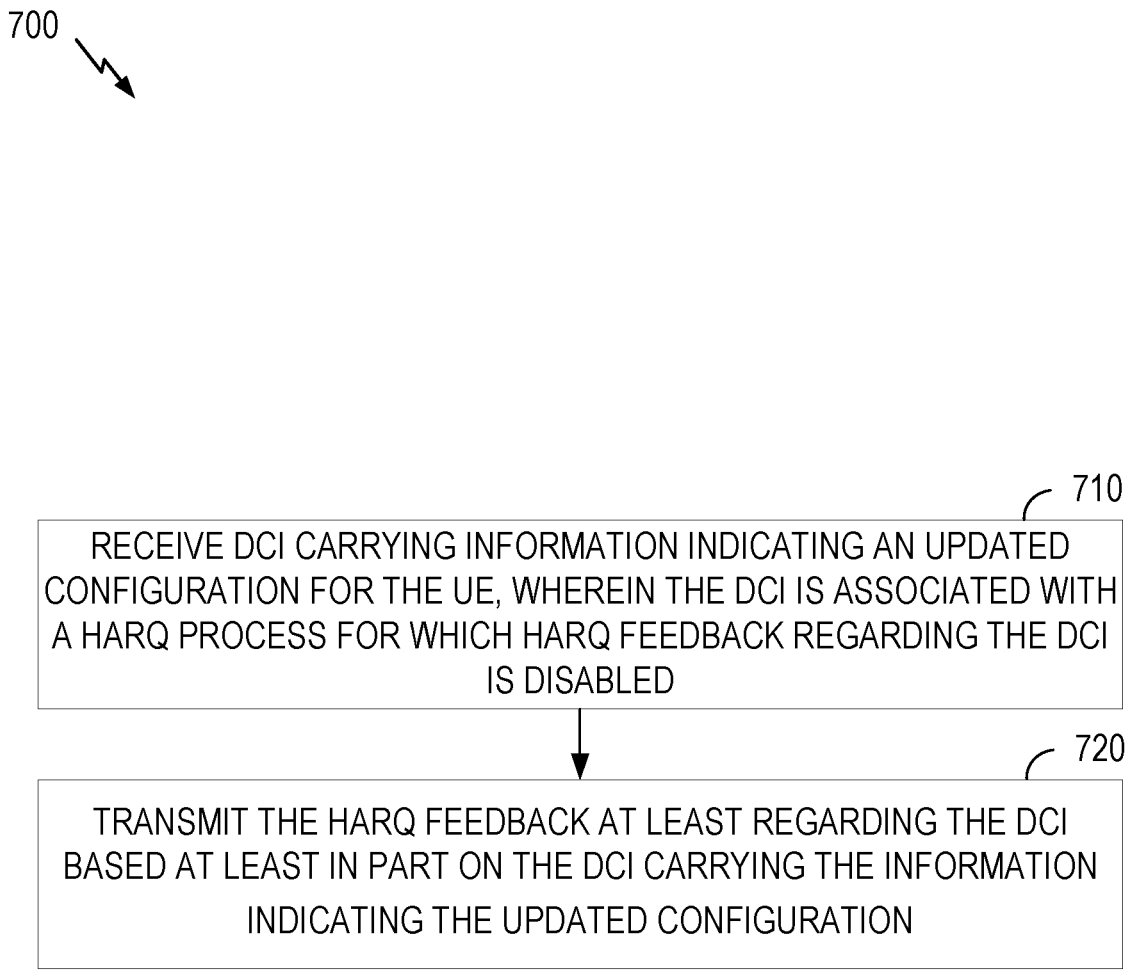
FIG. 7 is a diagram illustrating an example process performed, for example, by a UE, in accordance with the present disclosure.

FIG. 7 is a diagram illustrating an example process 700 performed, for example, by a UE, in accordance with the present disclosure. As shown in FIG. 7, in some aspects, process 700 may include receiving DCI carrying information indicating an updated configuration for the UE, wherein the DCI is associated with a HARQ process for which HARQ feedback regarding the DCI is disabled (block 710). In some aspects, process 700 may include transmitting the HARQ feedback regarding the DCI based at least in part on the DCI carrying the information indicating the updated configuration (block 720).

Figure 8:
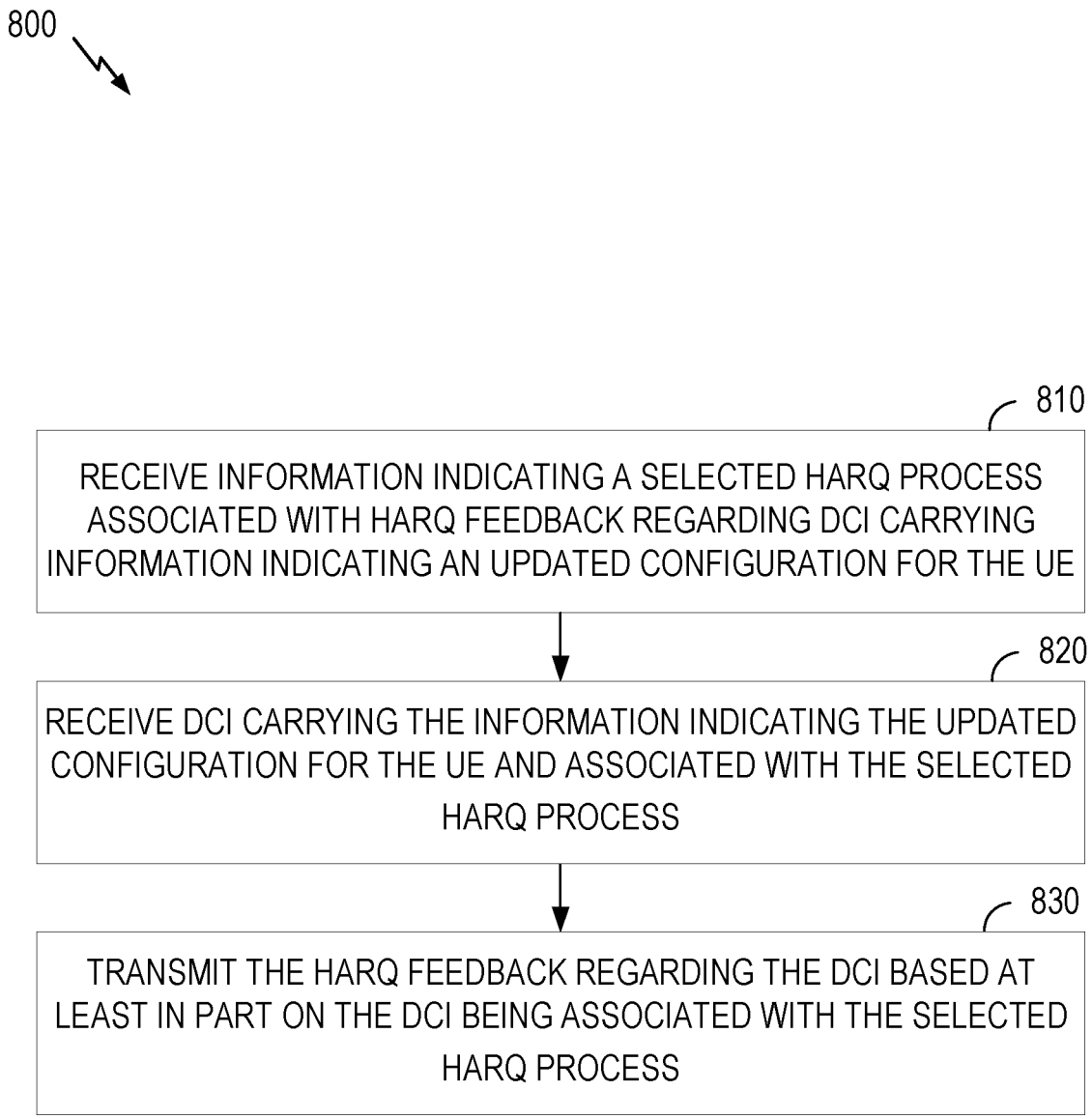
FIG. 8 is a diagram illustrating an example process performed, for example, by a UE, in accordance with the present disclosure.

FIG. 8 is a diagram illustrating an example process 800 performed, for example, by a UE, in accordance with the present disclosure. As shown in FIG. 8, in some aspects, process 800 may include receiving information indicating a selected HARQ process associated with HARQ feedback regarding DCI carrying information indicating an updated configuration for the UE (block 810). In some aspects, process 800 may include receiving DCI carrying the information indicating the updated configuration for the UE and associated with the selected HARQ process (block 820). In some aspects, process 800 may include transmitting the HARQ feedback regarding the DCI based at least in part on the DCI being associated with the selected HARQ process (block 830).

FIG. 9 is a diagram illustrating an example process 900 performed, for example, by a base station, in accordance with the present disclosure. As shown in FIG. 9, in some aspects, process 900 may include transmitting, to a UE, DCI including information indicating an updated configuration for the UE, wherein, based at least in part on the DCI including the information indicating the updated configuration for the UE, the DCI indicates a selected HARQ process for which HARQ feedback regarding the DCI is enabled (block 910). In some aspects, the selected HARQ process is configured as associated with DCI carrying information indicating an updated configuration (as in FIG. 6). In some aspects, the selected HARQ process is selected based at least in part on the selected HARQ process having HARQ feedback configured as enabled (as in FIG. 5). In some aspects, process 900 may include monitoring for the HARQ feedback regarding the DCI (block 920).

Example Wireless Communication Devices

Figure 10:
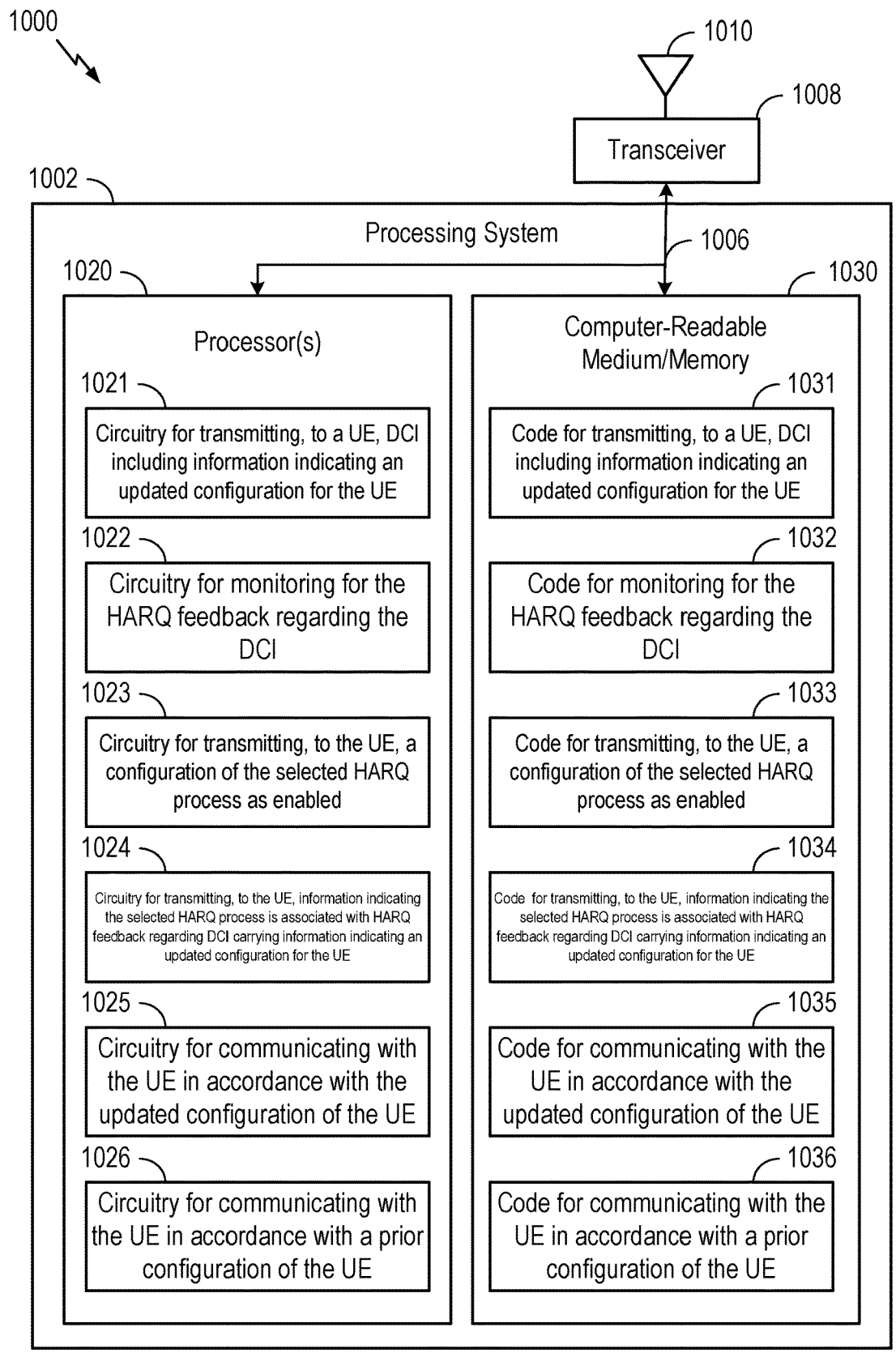
FIG. 10 depicts aspects of an example communications device.

FIG. 10 depicts an example communications device 1000 that includes various components operable, configured, or adapted to perform operations for the techniques disclosed herein, such as the operations depicted and described with respect to FIGS. 4-6 and FIG. 9. In some examples, communication device 1000 may be a base station 102 as described, for example, with respect to FIGS. 1 and 2.

Communications device 1000 includes a processing system 1002 coupled to a transceiver 1008 (e.g., a transmitter and/or a receiver). Transceiver 1008 is configured to transmit (or send) and receive signals for the communications device 1000 via an antenna 1010, such as the various signals as described herein. Processing system 1002 may be configured to perform processing functions for communications device 1000, including processing signals received and/or to be transmitted by communications device 1000.

Processing system 1002 includes one or more processors 1020 coupled to a computer-readable medium/memory 1030 via a bus 1006. In certain aspects, computer-readable medium/memory 1030 is configured to store instructions (e.g., computer-executable code) that when executed by the one or more processors 1020, cause the one or more processors 1020 to perform the operations illustrated in FIGS. 4-6 and FIG. 9, or other operations for performing the various techniques discussed herein for transmit DCI including information indicating an updated configuration for a UE; and monitor for HARQ feedback regarding the DCI.

In the depicted example, computer-readable medium/memory 1030 stores code 1031 for transmitting, to a UE, DCI including information indicating an updated configuration for the UE, code 1032 for monitoring for the HARQ feedback regarding the DCI, code 1033 for transmitting, to the UE, a configuration of the selected HARQ process as enabled, code 1034 for transmitting, to the UE, information indicating the selected HARQ process is associated with HARQ feedback regarding DCI carrying information indicating an updated configuration for the UE, code 1035 for communicating with the UE in accordance with the updated configuration of the UE, and code 1036 for communicating with the UE in accordance with a prior configuration of the UE.

In the depicted example, the one or more processors 1020 include circuitry configured to implement the code stored in the computer-readable medium/memory 1030, including circuitry 1021 for transmitting, to a UE, DCI including information indicating an updated configuration for the UE, circuitry 1022 for monitoring for the HARQ feedback regarding the DCI, circuitry 1023 for transmitting, to the UE, a configuration of the selected HARQ process as enabled, circuitry 1024 for transmitting, to the UE, information indicating the selected HARQ process is associated with HARQ feedback regarding DCI carrying information indicating an updated configuration for the UE, circuitry 1025 for communicating with the UE in accordance with the updated configuration of the UE, and circuitry 1026 for communicating with the UE in accordance with a prior configuration of the UE.

Various components of communications device 1000 may provide means for performing the methods described herein, including with respect to FIGS. 3-5 and 8.

In some examples, means for transmitting or sending (or means for outputting for transmission) may include the transceivers 232 and/or antenna(s) 234 of the base station 102 illustrated in FIG. 2 and/or transceiver 1008 and antenna 1010 of the communication device 1000 in FIG. 10.

In some examples, means for receiving (or means for obtaining) may include the transceivers 232 and/or antenna(s) 234 of the base station illustrated in FIG. 2 and/or transceiver 1008 and antenna 1010 of the communication device 1000 in FIG. 10.

In some examples, means for transmitting DCI including information indicating an updated configuration for the UE and means for monitoring for the HARQ feedback regarding the DCI may include various processing system components, such as: the one or more processors 1020 in FIG. 10, or aspects of the base station 102 depicted in FIG. 2, including receive processor 238, transmit processor 220, TX MIMO processor 230, and/or controller/processor 240 (including communication manager 241).

Notably, FIG. 10 is an example, and many other examples and configurations of communication device 1000 are possible.

Figure 11:
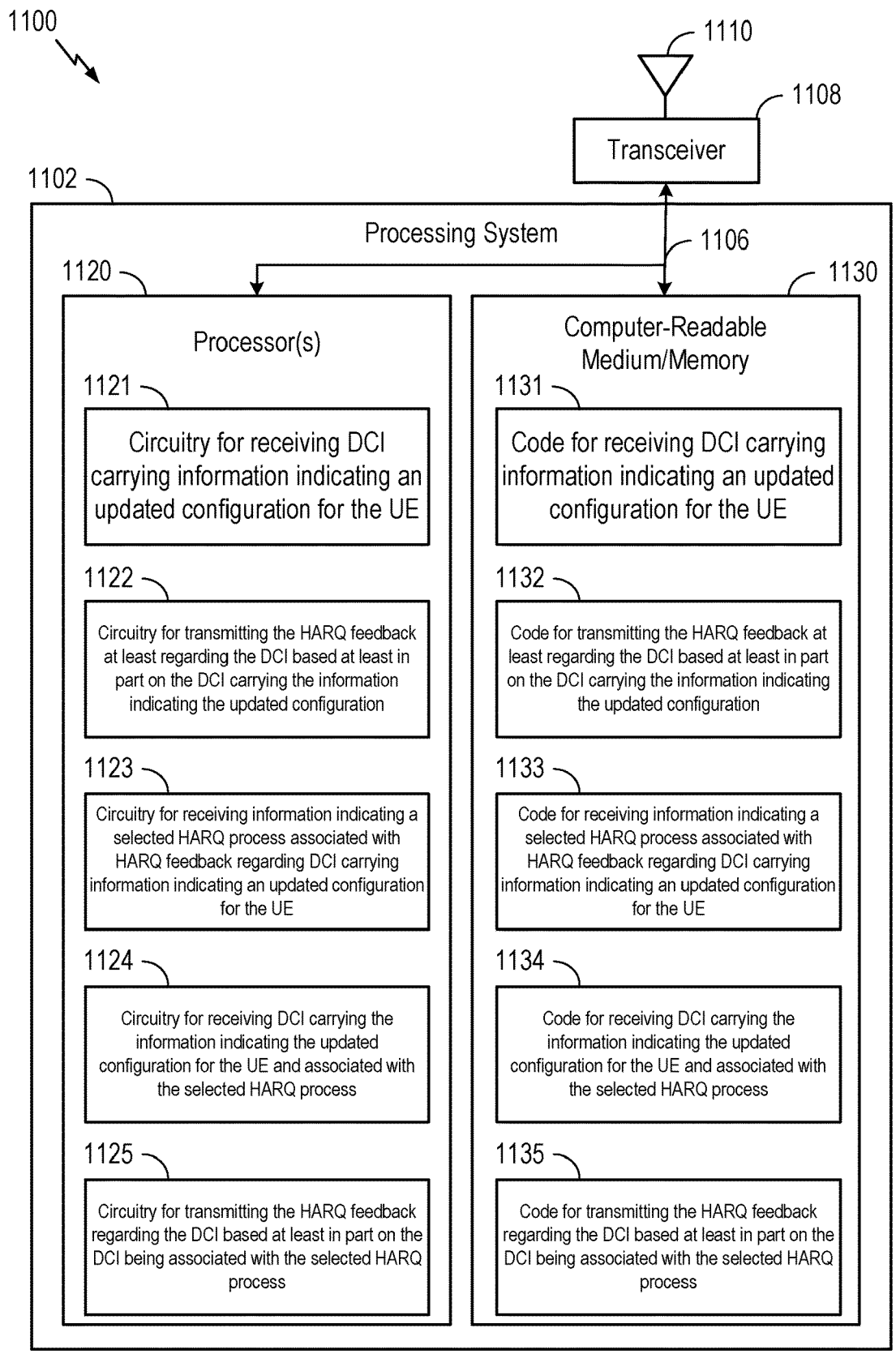
FIG. 11 depicts aspects of an example communications device.

FIG. 11 depicts an example communications device 1100 that includes various components operable, configured, or adapted to perform operations for the techniques disclosed herein, such as the operations depicted and described with respect to FIGS. 4-8. In some examples, communication device 1100 may be a user equipment 104 as described, for example, with respect to FIGS. 1 and 2.

Communications device 1100 includes a processing system 1102 coupled to a transceiver 1108 (e.g., a transmitter and/or a receiver). Transceiver 1108 is configured to transmit (or send) and receive signals for the communications device 1100 via an antenna 1110, such as the various signals as described herein. Processing system 1102 may be configured to perform processing functions for communications device 1100, including processing signals received and/or to be transmitted by communications device 1100.

Processing system 1102 includes one or more processors 1120 coupled to a computer-readable medium/memory 1130 via a bus 1106. In certain aspects, computer-readable medium/memory 1130 is configured to store instructions (e.g., computer-executable code) that when executed by the one or more processors 1120, cause the one or more processors 1120 to perform the operations illustrated in FIGS. 4-8, or other operations for performing the various techniques discussed herein for receive DCI carrying information indicating an updated configuration for the UE; and transmit HARQ feedback regarding the DCI based at least in part on the DCI carrying the information indicating the updated configuration.

In the depicted example, computer-readable medium/memory 1130 stores code 1131 for receiving DCI carrying information indicating an updated configuration for the UE, code 1132 for transmitting the HARQ feedback regarding the DCI based at least in part on the DCI carrying the information indicating the updated configuration, code 1133 for receiving information indicating a selected HARQ process associated with HARQ feedback regarding DCI carrying information indicating an updated configuration for the UE, code 1134 for receiving DCI carrying the information indicating the updated configuration for the UE and associated with the selected HARQ process, and code 1135 for transmitting the HARQ feedback regarding the DCI based at least in part on the DCI being associated with the selected HARQ process.

In the depicted example, the one or more processors 1120 include circuitry configured to implement the code stored in the computer-readable medium/memory 1130, including circuitry 1121 for receiving DCI carrying information indicating an updated configuration for the UE, circuitry 1122 for transmitting the HARQ feedback regarding the DCI based at least in part on the DCI carrying the information indicating the updated configuration, circuitry 1123 for receiving information indicating a selected HARQ process associated with HARQ feedback regarding DCI carrying information indicating an updated configuration for the UE, circuitry 1124 for receiving DCI carrying the information indicating the updated configuration for the UE and associated with the selected HARQ process, and circuitry 1125 for transmitting the HARQ feedback regarding the DCI based at least in part on the DCI being associated with the selected HARQ process.

Various components of communications device 1100 may provide means for performing the methods described herein, including with respect to FIGS. 4-8.

In some examples, means for transmitting or sending (or means for outputting for transmission) may include the transceivers 254 and/or antenna(s) 252 of the user equipment 104 illustrated in FIG. 2 and/or transceiver 1108 and antenna 1110 of the communication device 1100 in FIG. 11.

In some examples, means for receiving (or means for obtaining) may include the transceivers 254 and/or antenna(s) 252 of the user equipment 104 illustrated in FIG. 2 and/or transceiver 1108 and antenna 1110 of the communication device 1100 in FIG. 11.

In some examples, means for receiving DCI carrying information indicating an updated configuration for the UE, means for transmitting the HARQ feedback regarding the DCI based at least in part on the DCI carrying the information indicating the updated configuration, means for receiving information indicating a selected HARQ process associated with HARQ feedback regarding DCI carrying information indicating an updated configuration for the UE, means for receiving DCI carrying the information indicating the updated configuration for the UE and associated with the selected HARQ process, and means for transmitting the HARQ feedback regarding the DCI based at least in part on the DCI being associated with the selected HARQ process may include various processing system components, such as: the one or more processors 1120 in FIG. 11, or aspects of the user equipment 104 depicted in FIG. 2, including receive processor 258, transmit processor 264, TX MIMO processor 266, and/or controller/processor 280 (including communication manager 281).

Notably, FIG. 11 is an example, and many other examples and configurations of communication device 1100 are possible.

Example Clauses

Implementation examples are described in the following numbered clauses:

Clause 1: A method of wireless communication performed by a user equipment (UE), comprising: receiving downlink control information (DCI) carrying information indicating an updated configuration for the UE, wherein the DCI is associated with a hybrid automatic repeat request (HARQ) process for which HARQ feedback regarding the DCI is disabled; and transmitting the HARQ feedback regarding the DCI based at least in part on the DCI carrying the information indicating the updated configuration.

Clause 2: The method of Clause 1, where transmitting the HARQ feedback regarding the DCI based at least in part on the DCI carrying the information indicating the updated configuration further comprises: transmitting, based at least in part on the DCI carrying the information indicating the updated configuration, the HARQ feedback regarding the DCI irrespective of whether the HARQ process is configured as HARQ feedback enabled or disabled.

Clause 3: The method of Clause 2, further comprising: determining that the DCI carries the information indicating the updated configuration.

Clause 4: The method of Clause 3, wherein the information indicating the updated configuration includes a bandwidth part indicator.

Clause 5: The method of Clause 3, wherein the information indicating the updated configuration includes a secondary cell dormancy indicator.

Clause 6: The method of Clause 3, wherein the information indicating the updated configuration includes a minimum applicable scheduling offset indicator.

Clause 7: The method of Clause 3, wherein the information indicating the updated configuration includes a search space set group switching indicator.

Clause 8: The method of Clause 3, wherein the information indicating the updated configuration includes a satellite enabling indicator or a satellite disabling indicator.

Clause 9: The method of Clause 3, wherein the information indicating the updated configuration includes a beam enabling indicator or a beam disabling indicator.

Clause 10: The method of Clause 3, wherein the information indicating the updated configuration includes a physical downlink control channel skipping indicator.

Clause 11: The method of any of Clauses 1-10, further comprising: receiving an indication of a resource for the HARQ feedback, wherein transmitting the HARQ feedback regarding the DCI based at least in part on the DCI carrying the information indicating the updated configuration further comprises: transmitting the HARQ feedback on the resource.

Clause 12: The method of any of Clauses 1-11, wherein transmitting the HARQ feedback regarding the DCI based at least in part on the DCI carrying the information indicating the updated configuration further comprises: identifying an indicated resource for the HARQ feedback based at least in part on the DCI.

Clause 13: The method of Clause 12, further comprising: receiving configuration information identifying the indicated resource.

Clause 14: The method of Clause 12, wherein the UE is pre-configured with information identifying the indicated resource.

Clause 15: The method of Clause 12, further comprising: identifying the indicated resource based at least in part on one or more parameters of the DCI.

Clause 16: The method of any of Clauses 1-15, wherein the DCI does not schedule a transport block.

Clause 17: The method of any of Clauses 1-16, further comprising: receiving information indicating a selected HARQ process associated with HARQ feedback regarding DCI carrying updated configurations, wherein the selected HARQ process is the HARQ process for which the HARQ feedback regarding the DCI is disabled, and wherein transmitting the HARQ feedback regarding the DCI based at least in part on the DCI carrying the information indicating the updated configuration is based at least in part on the DCI being associated with the selected HARQ process.

Clause 18: A method of wireless communication performed by a user equipment (UE), comprising: receiving information indicating a selected hybrid automatic repeat request (HARQ) process associated with HARQ feedback regarding downlink control information (DCI) carrying information indicating an updated configuration for the UE; receiving DCI carrying the information indicating the updated configuration for the UE and associated with the selected HARQ process; and transmitting the HARQ feedback regarding the DCI based at least in part on the DCI being associated with the selected HARQ process.

Clause 19: The method of Clause 18, wherein transmitting the HARQ feedback regarding the DCI based at least in part on the DCI carrying the information indicating the updated configuration is further based at least in part on the DCI carrying the information indicating the updated configuration for the UE.

Clause 20: The method of any of Clauses 18-19, wherein the DCI does not schedule a transport block.

Clause 21: The method of any of Clauses 18-20, wherein the information indicating the updated configuration includes a bandwidth part indicator.

Clause 22: The method of any of Clauses 18-21, wherein the information indicating the updated configuration includes a secondary cell dormancy indicator.

Clause 23: The method of any of Clauses 18-22, wherein the information indicating the updated configuration includes a minimum applicable scheduling offset indicator.

Clause 24: The method of any of Clauses 18-23, wherein the information indicating the updated configuration includes a search space set group switching indicator.

Clause 25: The method of any of Clauses 18-24, wherein the information indicating the updated configuration includes a satellite enabling indicator or a satellite disabling indicator.

Clause 26: The method of any of Clauses 18-25, wherein the information indicating the updated configuration includes a beam enabling indicator or a beam disabling indicator.

Clause 27: The method of any of Clauses 18-26, wherein the information indicating the updated configuration includes a physical downlink control channel skipping indicator.

Clause 28: A method of wireless communication performed by a base station, comprising: transmitting, to a user equipment (UE), downlink control information (DCI) including information indicating an updated configuration for the UE, wherein, based at least in part on the DCI including the information indicating the updated configuration for the UE, the DCI indicates a selected hybrid automatic repeat request (HARQ) process for which HARQ feedback regarding the DCI is enabled; and monitoring for the HARQ feedback regarding the DCI.

Clause 29: The method of Clause 28, further comprising: transmitting, to the UE, a configuration of the selected HARQ process as enabled.

Clause 30: The method of any of Clauses 28-29, further comprising: transmitting, to the UE, information indicating the selected HARQ process is associated with HARQ feedback regarding DCI carrying updated configurations.

Clause 31: The method of any of Clauses 28-30, wherein the DCI indicates the selected HARQ process based at least in part on determining that the updated configuration is to be transmitted to the UE.

Clause 32: The method of any of Clauses 28-31, wherein the DCI does not schedule a transport block.

Clause 33: The method of any of Clauses 28-32, wherein the HARQ feedback indicates an acknowledgment or a negative acknowledgment for the DCI, and wherein the method further comprises: communicating with the UE in accordance with the updated configuration of the UE.

Clause 34: The method of any of Clauses 28-33, wherein no HARQ feedback for the DCI is detected, and wherein the method further comprises: communicating with the UE in accordance with a prior configuration of the UE.

Clause 35: The method of any of Clauses 28-34, wherein the information indicating the updated configuration includes a bandwidth part indicator.

Clause 36: The method of any of Clauses 28-35, wherein the information indicating the updated configuration includes a secondary cell dormancy indicator.

Clause 37: The method of any of Clauses 28-36, wherein the information indicating the updated configuration includes a minimum applicable scheduling offset indicator.

Clause 38: The method of any of Clauses 28-37, wherein the information indicating the updated configuration includes a search space set group switching indicator.

Clause 39: The method of any of Clauses 28-38, wherein the information indicating the updated configuration includes a satellite enabling indicator or a satellite disabling indicator.

Clause 40: The method of any of Clauses 28-39, wherein the information indicating the updated configuration includes a beam enabling indicator or a beam disabling indicator.

Clause 41: The method of any of Clauses 28-40, wherein the information indicating the updated configuration includes a physical downlink control channel skipping indicator.

Clause 42: An apparatus, comprising: a memory comprising executable instructions; one or more processors configured to execute the executable instructions and cause the apparatus to perform a method in accordance with any one of Clauses 1-17.

Clause 43: An apparatus, comprising means for performing a method in accordance with any one of Clauses 1-17.

Clause 44: A non-transitory computer-readable medium comprising executable instructions that, when executed by one or more processors of an apparatus, cause the apparatus to perform a method in accordance with any one of Clauses 1-17.

Clause 45: A computer program product embodied on a computer-readable storage medium comprising code for performing a method in accordance with any one of Clauses 1-17.

Clause 46: An apparatus, comprising: a memory comprising executable instructions; one or more processors configured to execute the executable instructions and cause the apparatus to perform a method in accordance with any one of Clauses 18-27.

Clause 47: An apparatus, comprising means for performing a method in accordance with any one of Clauses 18-27.

Clause 48: A non-transitory computer-readable medium comprising executable instructions that, when executed by one or more processors of an apparatus, cause the apparatus to perform a method in accordance with any one of Clauses 18-27.

Clause 49: A computer program product embodied on a computer-readable storage medium comprising code for performing a method in accordance with any one of Clauses 18-27.

Clause 50: An apparatus, comprising: a memory comprising executable instructions; one or more processors configured to execute the executable instructions and cause the apparatus to perform a method in accordance with any one of Clauses 28-41.

Clause 51: An apparatus, comprising means for performing a method in accordance with any one of Clauses 28-41.

Clause 52: A non-transitory computer-readable medium comprising executable instructions that, when executed by one or more processors of an apparatus, cause the apparatus to perform a method in accordance with any one of Clauses 28-41.

Clause 53: A computer program product embodied on a computer-readable storage medium comprising code for performing a method in accordance with any one of Clauses 28-41.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G New Radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving the coverage area, depending on the context in which the term is used. In NR systems, the terms "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscriptions. A pico cell may cover a relatively small geographic area (e.g., a sports stadium) and may allow unrestricted access by UEs with service subscriptions. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunication system (UMTS) Terrestrial Radio Access Network (E-UTRAN)) may interface with the EPC 160 through first backhaul links 132 (e.g., an Si interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interfaces). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180, may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communication system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether a channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communication systems, such as, for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) function 196.

AMF 192 is generally the control node that processes the signaling between UEs 104 and 5GC 190. Generally, AMF 192 provides QoS flow and session management.

All user IP packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid automatic repeat request (HARQ) indicator channel (PHICH), physical downlink control channel (PDCCH), group common PDCCH (GC PDCCH), and others. The data may be for the physical downlink shared channel (PDSCH), in some examples.

A medium access control (MAC) control element (MAC-CE) is a MAC layer communication structure that may be used for control command exchange between wireless nodes. The MAC-CE may be carried in a shared channel such as a PDSCH, a physical uplink shared channel (PUSCH), or a physical sidelink shared channel (PSSCH).

Transmit processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers

254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all of the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the PUSCH) from a data source 262 and control information (e.g., for the physical uplink control channel (PUCCH) from the controller/processor 280). Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As described above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description herein applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where $\mu$ is the numerology 0 to 5. Consequently, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs.

A resource grid may be used to represent the frame structure. Each time slot includes a resource block (RB) (also referred to as a physical RB (PRB)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., UE 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of DCI based feedback transmission in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g., 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2).

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices (e.g., a combination of a DSP and a microprocessor, a plurality of microprocessors, one or more microprocessors in conjunction with a DSP core, a system on a chip (SoC), or any other such configuration).

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A user equipment (UE) for wireless communication, comprising:
one or more memories; and
one or more processors coupled to the one or more memories, the one or more processors configured to cause the UE to:
receive downlink control information (DCI) carrying information indicating an updated configuration for the UE, wherein the DCI is associated with a hybrid automatic repeat request (HARQ) process for which HARQ feedback regarding the DCI is disabled based at least in part on a HARQ round-trip time associated with the HARQ feedback; and transmit the HARQ feedback regarding the DCI based at least in part on the DCI carrying the information indicating the updated configuration.

2. The UE of claim 1, wherein, to transmit the HARQ feedback regarding the DCI based at least in part on the DCI carrying the information indicating the updated configuration, the one or more processors are configured to cause the UE to:

transmit, based at least in part on the DCI carrying the information indicating the updated configuration, the HARQ feedback regarding the DCI irrespective of whether the HARQ process is configured as HARQ feedback enabled or disabled.

3. The UE of claim 1, wherein the information indicating the updated configuration includes at least one of:
a bandwidth part indicator,
a secondary cell dormancy indicator,
a minimum applicable scheduling offset indicator,
a search space set group switching indicator,
a satellite enabling indicator or a satellite disabling indicator,
a beam enabling indicator or a beam disabling indicator, or
a physical downlink control channel skipping indicator.

4. The UE of claim 1, wherein the one or more processors are further configured to cause the UE to:

receive an indication of a resource for the HARQ feedback, wherein, to transmit the HARQ feedback regarding the DCI based at least in part on the DCI carrying the information indicating the updated configuration, the one or more processors are configured to cause the UE to:

transmit the HARQ feedback on the resource.

5. The UE of claim 1, wherein, to transmit the HARQ feedback regarding the DCI based at least in part on the DCI carrying the information indicating the updated configuration, the one or more processors are configured to cause the UE to:

identify an indicated resource for the HARQ feedback based at least in part on the DCI.

6. The UE of claim 5, wherein the one or more processors are further configured to cause the UE to:

receive configuration information identifying the indicated resource.

7. The UE of claim 5, wherein the UE is pre-configured with information identifying the indicated resource.

8. The UE of claim 5, wherein the one or more processors are further configured to cause the UE to:

identify the indicated resource based at least in part on one or more parameters of the DCI.

9. The UE of claim 1, wherein the DCI does not schedule a transport block.

10. The UE of claim 1, wherein the one or more processors are further configured to cause the UE to:

receive information indicating a selected HARQ process associated with DCI indicating updated configurations, wherein the selected HARQ process is the HARQ process for which the HARQ feedback regarding the DCI is disabled, and wherein transmission of the HARQ feedback regarding the DCI based at least in part on the DCI carrying the information indicating the updated configuration is based at least in part on the DCI being associated with the selected HARQ process.

11. The UE of claim 1, wherein HARQ feedback regarding the DCI is disabled to avoid a delay associated with the HARQ round-trip time.

12. A user equipment (UE) for wireless communication, comprising:
one or more memories; and
one or more processors coupled to the one or more memories, the one or more processors configured to cause the UE to:

receive information indicating a selected hybrid automatic repeat request (HARQ) process associated with HARQ feedback regarding downlink control information (DCI) carrying information indicating an updated configuration for the UE, wherein the selected HARQ process is based at least in part on a HARQ round-trip time associated with the HARQ feedback;

receive the DCI carrying the information indicating the updated configuration for the UE and associated with the selected HARQ process; and transmit the HARQ feedback regarding the DCI based at least in part on the DCI being associated with the selected HARQ process.

13. The UE of claim 12, wherein the DCI does not schedule a transport block.

14. The UE of claim 12, wherein the information indicating the updated configuration includes at least one of:
a bandwidth part indicator,
a secondary cell dormancy indicator,
a minimum applicable scheduling offset indicator,
a search space set group switching indicator,
a satellite enabling indicator or a satellite disabling indicator,
a beam enabling indicator or a beam disabling indicator, or
a physical downlink control channel skipping indicator.

15. A base station, comprising:
one or more memories; and
one or more processors coupled to the one or more memories, the one or more processors configured to cause the base station to:

transmit, to a user equipment (UE), downlink control information (DCI) including information indicating an updated configuration for the UE, wherein, based at least in part on the DCI including the information indicating the updated configuration for the UE, the DCI indicates a selected hybrid automatic repeat request (HARQ) process for which HARQ feedback regarding the DCI is enabled based at least in part on a HARQ round-trip time associated with the HARQ feedback; and monitor for the HARQ feedback regarding the DCI.

16. The base station of claim 15, wherein the one or more processors are further configured to cause the base station to:

transmit, to the UE, a configuration of the selected HARQ process as enabled.

17. The base station of claim 15, wherein the one or more processors are further configured to cause the base station to:

transmit, to the UE, information indicating the selected HARQ process is associated with DCI carrying updated configurations.

18. The base station of claim 15, wherein the DCI does not schedule a transport block.

19. The base station of claim 15, wherein the HARQ feedback indicates an acknowledgment or a negative acknowledgment for the DCI, and wherein the one or more processors are further configured to cause the base station to:

communicate with the UE in accordance with the updated configuration of the UE.

20. The base station of claim 15, wherein no HARQ feedback for the DCI is detected, and wherein the one or more processors are further configured to cause the base station to:
   communicate with the UE in accordance with a prior configuration of the UE.

21. The method base station of claim 15, wherein the information indicating the updated configuration includes at least one of:
   a bandwidth part indicator,
   a secondary cell dormancy indicator,
   a minimum applicable scheduling offset indicator,
   a search space set group switching indicator,
   a satellite enabling indicator or a satellite disabling indicator,
   a beam enabling indicator or a beam disabling indicator, or
   a physical downlink control channel skipping indicator.

22. The base station of claim 15, wherein HARQ feedback regarding the DCI is disabled to avoid a delay associated with the HARQ round-trip time.

23. A method of wireless communication performed by a user equipment (UE), comprising:
   receiving downlink control information (DCI) carrying information indicating an updated configuration for the UE, wherein the DCI is associated with a hybrid automatic repeat request (HARQ) process for which HARQ feedback regarding the DCI is disabled based at least in part on a HARQ round-trip time associated with the HARQ feedback; and
   transmitting the HARQ feedback regarding the DCI based at least in part on the DCI carrying the information indicating the updated configuration.

24. The UE of claim 12, wherein HARQ feedback regarding the DCI is disabled to avoid a delay associated with the HARQ round-trip time.

* * * * *